(12) United States Patent
Pittenger et al.

(10) Patent No.: US 7,979,916 B2
(45) Date of Patent: Jul. 12, 2011

(54) PREAMPLIFYING CANTILEVER AND APPLICATIONS THEREOF

(76) Inventors: Bede Pittenger, Santa Barbara, CA (US); Kumar Virwani, Santa Barbara, CA (US); Benedikt Zeyen, Santa Barbara, CA (US)

( * ) Notice: Subject to any disclaimer, the term of this patent is extended or adjusted under 35 U.S.C. 154(b) by 182 days.

(21) Appl. No.: 12/472,183

(22) Filed: May 26, 2009

(65) Prior Publication Data

US 2010/0017923 A1   Jan. 21, 2010

Related U.S. Application Data

(60) Provisional application No. 61/055,925, filed on May 23, 2008.

(51) Int. Cl.
*G01Q 20/02* (2010.01)
*G01Q 60/00* (2010.01)

(52) U.S. Cl. ............................................. 850/6; 850/21
(58) Field of Classification Search .................. 850/5–6, 850/21, 33, 36–41, 55–57, 62–63; 73/105
See application file for complete search history.

(56) References Cited

U.S. PATENT DOCUMENTS

| | | | |
|---|---|---|---|
| 5,267,471 A | 12/1993 | Abraham et al. | |
| 5,406,832 A | 4/1995 | Gamble et al. | |
| 5,625,142 A * | 4/1997 | Gamble | 73/105 |
| 6,075,585 A | 6/2000 | Minne et al. | |
| 6,079,255 A | 6/2000 | Binnig et al. | |
| 6,249,000 B1 * | 6/2001 | Muramatsu et al. | 850/7 |
| 6,593,571 B1 | 7/2003 | Yasutake | |
| 6,668,628 B2 | 12/2003 | Hantschel et al. | |
| 6,935,167 B1 | 8/2005 | Sahin et al. | |
| 7,254,990 B2 | 8/2007 | Matsiev et al. | |
| 7,340,944 B2 | 3/2008 | Beyder et al. | |
| 2008/0041143 A1 | 2/2008 | Sahlin et al. | |
| 2008/0091374 A1 | 4/2008 | Wang | |
| 2008/0283755 A1 | 11/2008 | Dazzi et al. | |

(Continued)

FOREIGN PATENT DOCUMENTS

WO    WO 2006/136705    12/2006
(Continued)

OTHER PUBLICATIONS

International Preliminary Report on Patentability, International Application No. PCT/US2009/045177, Dated May 26, 2009, (5 pages).

International Search Report for International Application No. PCT/US2009/045177 dated Jan. 14, 2010.

(Continued)

*Primary Examiner* — Jack I Berman
*Assistant Examiner* — David Smith
(74) *Attorney, Agent, or Firm* — Patterson Thuente Christensen Pedersen P.A.

(57) ABSTRACT

Aspects of the invention are directed to piezoresponse force analysis of a material. A stimulus signal including a first frequency component is applied to a contact point on the material such that the stimulus signal actuates a portion of the material to experience a motion as a result of a piezoelectric effect. A resonant device is coupled to the contact point such that the resonant device experiences a resonant motion at the first frequency component in response to the motion of the material, the resonant motion having a greater displacement than a displacement of the motion of the material, and is substantially unaffected by mechanical properties of the material at the contact point. The resonant motion of the resonant device is detected and processed to produce a measurement representing the piezoresponse of the material at the contact point.

44 Claims, 12 Drawing Sheets

U.S. PATENT DOCUMENTS

| | | | |
|---|---|---|---|
| 2009/0013770 A1 | 1/2009 | Proksch et al. | |
| 2009/0040911 A1 | 2/2009 | Chou et al. | |
| 2009/0168636 A1* | 7/2009 | Chou | 369/126 |
| 2010/0257644 A1* | 10/2010 | Turner et al. | 850/8 |

FOREIGN PATENT DOCUMENTS

| | | |
|---|---|---|
| WO | WO 2007/095360 | 8/2007 |
| WO | WO 2007/133262 | 11/2007 |
| WO | WO 2008/027601 | 3/2008 |

OTHER PUBLICATIONS

Harnagea et al., "Higher-Order Electromechanical Response of Thin Films by Contact Resonance Piezoresponse Force Microscopy", IEEE Transactionf on Ultrasonics, Ferroelectrics and Frequency Conrol. vol. 53, No. 12. Dec. 2006. pp. 2309-2322.

Gruverman et al., "Imaging and Control of Domain Structures in Ferroelectric Thin Films Via Scanning Force Microscopy" Annu. Rev. Mater. Sci. 1998. 28:101-123.

Turner et al., "Design and Test of a Novel Higher Harmonic Imaging AFM Probe with a Dedicated Second Cantilever for Harmonic Amplification" Department of Mechanical Engineering, University of California. pp. 1-4, 2007.

Shijie Wu, Application Note, "Piezoresponse Force Microscopy" Agilent Technologies. Dec. 2007. pp. 1-4.

Zeyen et al., "Preamplification Cantilevers for Piezoresponse Force Microscopy" Applied Physics of Physics (2009) pp. 1-3.

Jungk et al., Quantitative analysis of ferroelectric domain imaging with piezoresponse force microscopy. Physical Institute. University of Bonn. (2007) pp. 1-11.

\* cited by examiner

View B-B

Treatment of electrostatics with DC bias

Eliminate electrostatics with $$V_{DC} = V_{2DC}$$

Then $$V_{DC,req} = \frac{R_{air} R_{bulk}}{R_{air} + R_{bulk}} \dot{q}$$

PREAMPLIFYING CANTILEVER AND APPLICATIONS THEREOF

PRIOR APPLICATION

This Application claims the benefit of U.S. Provisional Application No. 61/055,925 filed May 23, 2008, and entitled "PREAMPLIFYING CANTILEVERS FOR PIEZORESPONSE FORCE MICROSCOPY," which is incorporated by reference herein in its entirety.

FIELD OF THE INVENTION

The invention relates generally to scanning probe microscopy and related applications, such as data storage, and, more particularly, to scanning probe microscopy techniques in which the sample surface is actuated to produce a motion to be measured, such as piezoresponse force microscopy apparatus and techniques, for example.

BACKGROUND OF THE INVENTION

Piezoresponse force microscopy (PFM) is a contact mode scanning probe microscopy (SPM) technique, which in its most basic form is used to measure out-of-plane and in-plane displacement response of ferroelectric and piezoelectric materials. For simplicity, hereinafter, the term piezoelectric will be used generally to denote materials having piezoelectric properties, including ferroelectric materials. The PFM technique is based on the reverse piezoelectric effect, where a piezoelectric material expands or contracts upon applying an electric field to the material. PFM is an example of the more general subset of SPM techniques that investigate surface motion of an actuated material that is actuated as part of the measurement technique.

PFM is described generally in Shijie Wu, *Application Note: Piezoresponse Force Microscopy*, Agilent Technologies (2007), which is incorporated by reference herein. In PFM, the scanning probe microscope probes a sample's mechanical response to an applied electric field. Both, contact, and non-contact techniques for PFM are known. PFM enables measurements and characterization of piezoelectric behavior of materials on the nanometer, and sub-nanometer scale. For instance, PFM can measure the electromechanical response of a material on the level of individual nanometer-scale grains. The PFM has been shown to delineate regions of different piezoresponse with sub-nanometer lateral resolution.

In PFM a micromachined probe is typically situated at the end of a cantilever. The probe tip used in PFM is usually made of, or is coated with, a conductive material, as this conductivity facilitates the electrical contact between the probe tip and the sample of material being analyzed. In contact mode PFM, an AC stimulus signal with an optional DC offset bias is applied to the probe tip, which is held in contact with the sample surface, and the piezoresponse of this sample is measured from the deflection of the cantilever using known detection techniques such as, for example, inferometry, scanning tunneling microscopy (STM) techniques, piezoelectric sensors, and optical beam techniques.

Vertical motion (i.e., perpendicular to the surface being measured), as well as lateral motion (i.e., parallel to the surface), can be detected. PFM can produce a topographic image of the surface of the sample, a piezoresponse image representing the piezoelectric properties of grains of piezoelectric material, and a phase image representing the polar orientation of the grains. PFM is particularly useful in investigating the nanometer-scale piezoelectric properties of ferroelectrics, which are the subject of intense research and development for their optoelectronic, sensor, and high-density memory applications. The lateral resolution of PFM provides highly localized information about the electromechanical behavior of thin ferroelectric films.

The amplitude and the phase of the motion are detected. This measurement technique permits the piezoresponse (PR) vector of the sample to be quantified. The displacement in the motion of the cantilever in response to PR of the sample of material is usually on the order of picometers per volt of applied AC stimulus. These displacements are detected and processed to produce the PFM measurement. Due to the very small displacements, and given the presence of electrical noise, which is unavoidably encountered in practice, conventional PFM suffers from poor signal-to-noise ratio (SNR). There are practical limits to increasing the amplitude of the AC stimulus to improve the SNR. For different materials, exceeding a certain voltage tends to re-polarize the piezoelectric domains, thereby altering the properties being measured. Accordingly, stimulation signal amplitudes must be kept low, typically necessitating the use of a lock-in amplifier. Indeed, certain materials exhibiting high re-polarization sensitivity to the stimulus signals are particularly difficult to measure using conventional techniques.

In conventional PFM techniques, the frequency of the applied AC stimulus signal has been designed to be far below the fundamental resonance frequency of the cantilever so as to avoid driving the cantilever into resonant oscillations. This is done mainly to facilitate signal processing, since the ability of the analysis system to amplify the signal representing the detected motion is determined by the signal's quality factor, Q. The Q of the contact mode measurement arrangement, with the sample being driven at a frequency far below the cantilever's first resonance, is equal to unity.

More recently, techniques based on contact resonance PFM have been developed. The contact resonance frequency is the frequency at which a system comprising a scanning probe microscope (SPM) probe in contact with an oscillating surface reaches resonance. Contact resonance PFM has been used to amplify the out-of-plane response and also to measure higher order electromechanical coefficients of ferroelectric thin film materials, thereby increasing the SNR for these measurements.

While contact mode resonance techniques offer certain advantages, they also introduce certain limitations. These include the coupling of the cantilever inertia and elastic response of the sample into the measured signal. Additionally, contact resonance characteristics include complex vibration modes, which are affected by the contact area between the probe and the sample in addition to the geometry of the cantilever itself. Accordingly, the resonant frequency and the quality factor Q of the oscillation can vary significantly from point to point on even the same sample. The result, unfortunately, is the introduction of artifacts into the PFM measurement. These effects are difficult to physically quantify and correct, and hence present challenges when interpreting contact resonance PFM data.

Moreover, certain types of PFM analyses are simply not possible using known contact resonance techniques. For instance, contact resonance typically utilizes resonant frequencies of over 100 kHz, which makes contact resonance ill-suited for measuring in-plane motion of piezoelectric domains, since the probe tip does not remain with the surface at those frequencies.

In other applications of scanning probe microscopes, such as impact mode nanomechanical analysis, in particular, techniques have been developed to amplify higher-order harmonics while suppressing the excitation signal. In Turner et al., WIPO Publication No. WO 2007/095360, various preamplifying cantilevers are described for use with dynamic analysis of nanomechanical properties in which the sample material is repeatedly struck in a tapping mode by a probe tip at the end of an indentation cantilever or actuator operating in a tapping mode at a certain excitation frequency. The impacts generate higher-order oscillations, which the preamplifying cantilever of Turner et al. aims to amplify, while suppressing the excitation frequency. While Turner et al. achieve certain kinds of mechanical preamplification using principles of resonance, their approach does not address the challenges introduced by the coupling of the sample's mechanical properties into the measurement of PFM. To the contrary, the main applications discussed in Turner et al. are specifically aimed at measuring the sample's mechanical properties. Thus, Turner et al. provides little, if any, guidance on solving the problems specific to PFM and similar applications in which a de-coupling of the sample's mechanical properties from the measurement is desired.

In view of the challenges discussed above, an in view of other challenges of enhancing PFM performance, a more effective and efficient solution is needed for improving the accuracy and sensitivity of PFM.

SUMMARY OF THE INVENTION

One aspect of the invention is directed to conducting analysis of nanoscale surface motion of a material, such as piezoresponse force analysis. A stimulus signal including a first frequency component is applied to a contact point on the surface of the material such that the stimulus signal actuates a portion of the material to produce a motion as a result of a transduction by the material, such as by a piezoelectric effect, for instance. A resonant device is rigidly coupled to the contact point such that substantially all of the actuated motion of the material is transmitted to the resonant device (i.e. without any detectable damping or additional spring or resonant action) and such that that the resonant device experiences a resonant motion at the first frequency component in response to the motion of the material, the resonant motion having a greater displacement than a displacement of the motion of the material, and is substantially unaffected by mechanical properties of the material at the contact point. The resonant motion of the resonant device is detected and processed to produce a measurement representing the actuated motion of the material at the contact point.

Another aspect of the invention is directed to a preamplifying cantilever arrangement for use with a scanning probe microscope (SPM). The arrangement includes a main cantilever portion having a first operational length defined by a first end and a second end, with the first end being formed such that (when operably mounted in the PFM) the main cantilever portion is supported by the first end. The second end has a protruding tip adapted to contact a surface of a ferroelectric material. A resonator cantilever portion has a second operational length defined by a third end and a fourth end, with the third end being connected to the main cantilever portion.

The main cantilever portion is formed such that, when the preamplifying cantilever is used in a measurement arrangement in which the protruding tip is in contact with a rigid surface of the ferroelectric material, the main cantilever portion exhibits a first set of resonance characteristics that include a first set of fundamental frequencies and their overtones, and the resonator cantilever portion is formed such that it has a second set of resonance characteristics including a second set of fundamental frequencies and corresponding overtones, the second set of resonance characteristics being substantially distinct from any frequency of the first range of fundamental frequencies and at least a substantial portion of the overtones corresponding to first range of fundamental frequencies, such that resonant motion of the resonator cantilever is substantially un-coupled from any resonant motion of the main cantilever portion when the preamplifying cantilever is used in the measuring arrangement.

A measurement arrangement for actuated surface motion analysis of a surface of a material according to another aspect of the invention includes a signal generator, an electrical probe, a resonant cantilever, and a detection system. The signal generator is constructed to generate a stimulus signal having at least an alternating current component at a first frequency, with the stimulus signal adapted to actuate a portion of the surface of the material during measurement to create an actuated motion. The probe has a tip that contacts the surface of the material at a contact point, with the contact being achieved via a controlled probe-sample interaction. The resonant cantilever having a fixed end and a free end, is fixed to the contact point at the fixed end during measurement via a mechanical coupling having a sufficient rigidity such that substantially all of the actuated motion of the material is transmitted to the resonant cantilever. The detection system configured to detect motion of the resonant cantilever during measurement.

In another aspect of the invention, a system is provided for measuring a surface configuration of a material. A signal generator is constructed to generate a stimulus signal having at least an alternating current component at a first frequency, with the stimulus signal being adapted to actuate a portion of the surface of the material. A probe tip is adapted to contact the surface of the material at a positionable contact point established by a relative positioning of the probe tip and the material. The contact is defined based on a constant interaction force between the probe tip and the surface of the material. A positioning system operably couples the probe tip and the material, and is configured to control the interaction force between the probe tip and the surface of the material, and to adjust the relative positioning of the probe tip and the material to re-position the contact point.

A preamplifying cantilever is provided that has a supporting segment and a resonator segment; with the supporting segment being part of the positioning system and having a probe end comprising the probe tip; and the resonator segment being a distinct segment from the supporting segment and has resonant characteristics that substantially differ from resonant characteristics of the supporting segment, and having a first end coupled to the probe tip such that substantially all motion of the probe tip is transmitted to the resonator segment (i.e. without introducing damping or additional resonances). The preamplifying cantilever is electrically coupled to the signal generator such that the supporting segment facilitates a portion of the signal path, and a detector is configured to detect motion of the resonator segment. The system is constructed such that, in operation, the motion of the resonator segment is caused by the stimulus signal actuating the material at the contact point.

BRIEF DESCRIPTION OF THE DRAWINGS

The invention may be more completely understood in consideration of the following detailed description of various embodiments of the invention in connection with the accompanying drawings, in which.

Figure 1:
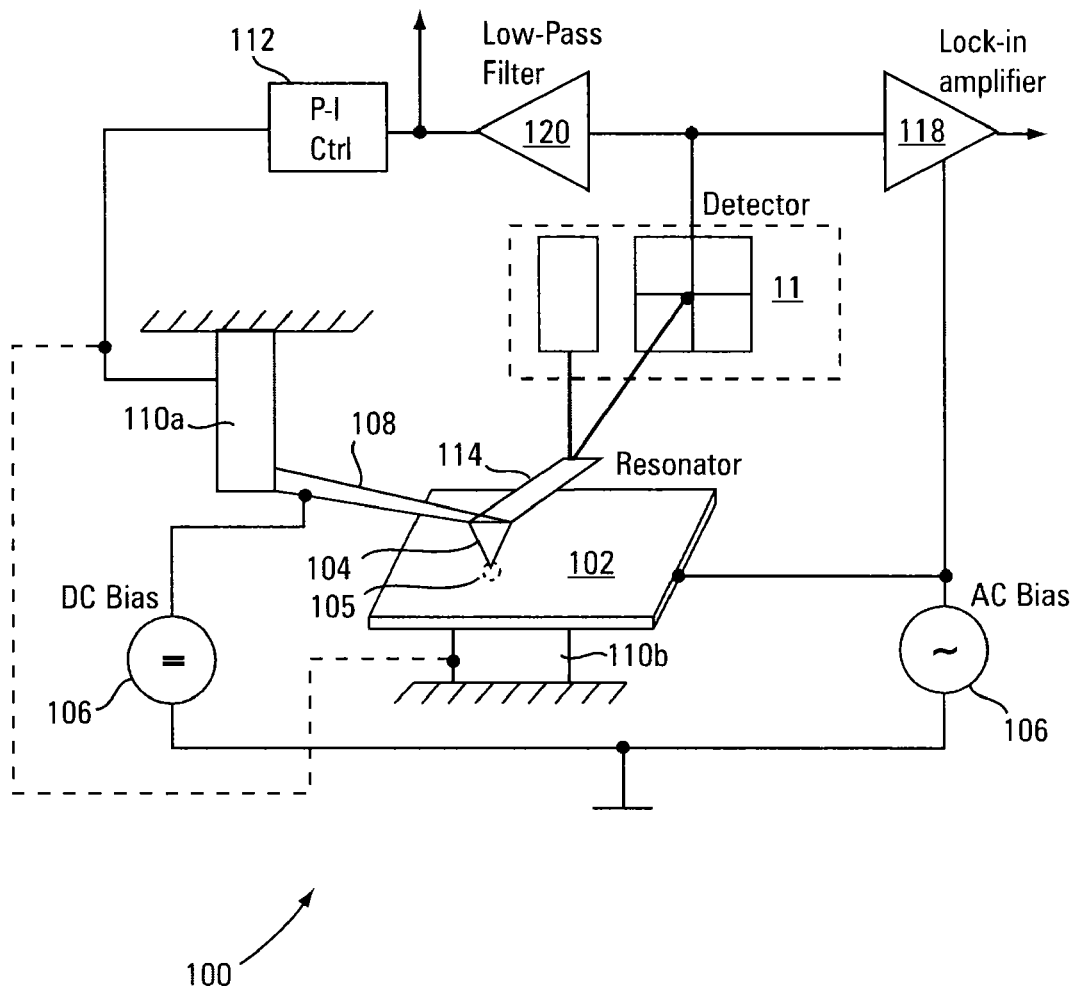
FIG. 1 is a diagram illustrating a measurement arrangement according to one embodiment of the invention, in which a PFM technique is implemented using a resonator device.

While the various aspects of the invention are amenable to various modifications and alternative forms, specifics thereof have been shown by way of example in the drawings and will be described in detail. It should be understood, however, that the intention is not to limit the various aspects of the invention to the particular embodiments described. On the contrary, the intention is to cover all modifications, equivalents, and alternatives falling within the spirit and scope of the various aspects of the invention as defined by the appended claims.

DETAILED DESCRIPTION OF THE PREFERRED EMBODIMENTS

One aspect of the invention is directed to a preamplifying cantilever design that is specifically adapted for enhancing measurement of surface motion of an actual material being subject to actuation that causes the surface motion. Further aspects are directed to techniques featuring the use of mechanical preamplification in the cantilever. Piezoresponse force microscopy (PFM) is one class of scanning probe microscopy (SPM) techniques that create and measure such surface motion and, for the sake of simplicity, the following description features embodiments utilizing that type of application as a representative example of the context in which the principles of the invention can be applied. However, the inventors contemplate applying the principles evident from these embodiments to other, related areas of scanning probe microscopy, in which benefits provided by aspects of the invention may also be applicable. For example, the invention may be applied using any of a variety of techniques for actuating the surface of the sample including, without limitation, techniques that produce a piezoelectric effect, a thermomechanical effect, an electromechanical effect, a magnetic effect, an electrorestrictive effect, or any combination thereof. Accordingly, the scope of the claimed invention is not limited to contact mode PFM implementations, unless such limitation is specifically stated in certain claims, in which case only those certain claims shall be so limited.

As examples of some conventional PFM techniques that can be modified based on principles of the invention, see A. Gruverman, O. Auciello and H. Tokumoto, *Imaging And Control of Domain Structures in Ferroelectric Thin Films Via Scanning Force Microscopy*" Annu. Rev. Mater. Sci. 1998. 28:101-123, incorporated by reference herein. Also, see C. Harnagea, A. Pignolet, M. Alexe and D. Hesse, *Higher-Order Electromechanical Response of Thin Films by Contact Resonance Piezoresponse Force Microscopy*, IEEE Transactions on Ultrasonics, Ferroelectrics, and Frequency Control, Vol. 53, No. 12, pp. 2309-2322 (December 2006), also incorporated by reference herein. Principles of the invention may be applied to certain ones of those conventional PFM techniques (that are not incompatible with the invention), or to other compatible PFM techniques, to take advantage of one or more benefits provided by aspects of the invention, such as improved SNR, accuracy, and the ability to perform PFM analysis on particularly sensitive materials that were previously un-measurable using conventional technologies.

FIG. 1 is a diagram illustrating a measurement arrangement 100 according to one embodiment of the invention. Measurement arrangement 100 utilizes a PFM technique in which sample 102 having certain piezoelectric properties, such as ferroelectric film, for example, is measured utilizing those piezoelectric properties. Probe 104 has a tip of nanoscale sharpness contacting the surface of the ferroelectric material at contact point 105. In the context of SPM, contact implies some degree of interaction force between the material and the probe tip, which can be in the form of attractive and/or repulsive forces. In the context of some aspects of the invention, the contact between the probe tip and the sample is generally constant, and has sufficient interaction that the contact is effectively rigid, or quasi-static (i.e., substantially all of the surface motion is transmitted to the probe tip, with any damping or spring-like interaction being marginal or even undetectable). In one type of embodiment, tip 104 is so sharp that contact point 105 is smaller than a single piezoelectric domain of sample 102. The tip of probe 104 is electrically coupled to signal generator 106, and facilitates transmission of the output of signal generator 106 to contact point 105. Signal generator 106 generates a stimulus signal, or excitation signal, which actuates sample 102 at contact point 105.

The stimulus signal includes at least an AC signal component with a particular frequency and amplitude. In one embodiment, the amplitude is adjusted to be as large as practical without disturbing the polarization of the piezoelectric domains being studied. The amplitude is thus set according to the particular material of sample 102. Typically, the amplitude is between 100 mV and 10 V; however, there may be applications where amplitudes outside this range may be used. Signal generator may also produce a DC component of the stimulus signal, as depicted at 106' in FIG. 1. The signal path of the stimulus signal from signal generator 106 includes sample 102, probe 104, and supporting cantilever 108.

Besides providing a signal path for the stimulus signal, supporting cantilever 108 also supports probe 104, and is part of the positioning system that controls the interaction of probe 104 and sample 102. In one embodiment, probe 104 is integrally formed with supporting cantilever 108 such that probe 104 has its probe tip protruding from a surface of cantilever 108. According to one type of embodiment, supporting cantilever 108 has a second end that is fixed. In another embodiment, supporting cantilever 108 is mounted or otherwise mechanically coupled to a positioning actuator such as the actuator depicted at 110a in FIG. 1. When a PFM measurement is being made and probe 104 is in contact with sample 102, the second end is held fixed, even if it is coupled to positioning actuator 110a. Also, it should be understood that, in measuring arrangement 100 during measurement, supporting cantilever 108 is not technically a cantilever in the structural sense, since both ends are rigidly coupled to the sample and there is consequently no free end; however, consistent with common usage of the term "cantilever" in the SPM arts, the term shall be used to refer to element 108 even during measurement.

Actuator 110a can be used for positioning and re-positioning of cantilever 108 relative to sample 102 (and therefore positioning probe 104 to different contact points 105). In one embodiment, actuator 110a includes a Z-actuator for moving cantilever 108 in a direction perpendicular to the surface of sample 102. In a related embodiment, actuator 110a includes a set of X-Y actuators to move cantilever 108 along directions parallel to the surface of sample 102. Actuator 110a can be in the form of a piezo tube, or can be any other suitable type of actuator such as piezo stacks, for example, or a combination of the two. Other types of actuators would certainly be well within the spirit of the invention.

In another type of embodiment, the relative positioning of probe 108 and sample 102 is accomplished using actuator 110b mechanically coupled to the sample. Actuator 110b moves the sample, rather than cantilever 108. Actuator 110b, like actuator 110a can include individual actuators for either the X-Y, or Z, directions, or any combination thereof, and the individual actuators can be of any suitable type. Actuators 110a and 110b can also include both coarse and fine positioning actuators associated with separate control loops. In a related embodiment, system 100 can include a combination of actuators 110a and 110b such as, for example, X-Y motion provided by actuator 110b, and Z motion provided by actuator 110a. Positioning actuators 110a and 110b are controlled by positioning controller 112, depicted as a proportional-integral controller according to one embodiment. Other types of positioning control can be used in various other embodiments.

When sample 102 is actuated by the stimulus signal, the piezoelectric domain or domains being excited cause motion of contact point 105, thereby moving the probe 104. The direction of the motion corresponds to the orientation of the piezoelectric domain(s) being probed. Unlike conventional non-resonance PFM techniques, which detect the motion of the probe tip, or contact resonance techniques, which use a stimulus signal to drive supporting cantilever 108 into resonant oscillation and detect the resonant motion at the apex of oscillating cantilever 108, embodiments of the present invention may utilize a distinct component, resonator 114, to amplify and measure the motion of probe 104 in response to actuation of contact point 105. In one embodiment, resonator 114 is rigidly coupled to contact point 105. For example, resonator 114 can be connected at or near probe 104. The coupling is rigid in the sense that any effect on the motion of resonator 114 that is attributable to the coupling is negligible.

In one embodiment, the end of resonator 114 that is opposite the end which is at or near probe 104 is a free end (i.e. uncoupled to any other structure), such that the resonant motion of resonator 114 is uncoupled from any other motion besides that of contact point 105. In a related embodiment, the motion of resonator 114 is generally unaffected by the mechanical properties of sample 102 or of the topographic features of the surface of sample 102.

In one embodiment, the fundamental resonant frequency of resonator 114 is lower than the fundamental resonant frequency of supporting cantilever when probe 104 is in contact with sample 102. In another related embodiment, the fundamental resonant frequency of resonator 114 is higher than the frequency associated with topographical features on sample 102.

According to one embodiment, resonator 114 is designed such that its fundamental resonant frequency and its overtones do not coincide with, and are not close to, the resonant frequency and overtones of supporting cantilever 108 when probe 104 is at contact point 105. Thus, the resonant characteristics of resonator 114 are unaffected by the mechanical properties of sample 102. Also, with resonator being distinct from the positioning system of measurement arrangement 100, the resonant characteristics of resonator 114 are advantageously unaffected by the mechanical structure of supporting cantilever 108 and any of the rest of the mechanics of measurement arrangement 100.

In a related embodiment, the design of resonator 114 takes into account the fact that a variety of different materials having correspondingly different nanomechanical properties might be measured by measurement arrangement 100. Since the nanomechanical properties of the sample being measured affect the characteristics of contact resonance, it is expected that the resonance characteristics of supporting cantilever 108 when probe 104 is at contact point 105, would actually constitute a range of frequencies for the fundamental frequency, and a range of frequencies for each of the overtones, with the ranges being defined based on the general range of nanomechanical properties associated with the sample materials that might be measured. Hence, in this embodiment, resonator 114 is constructed such that its resonant characteristics are well outside of those frequency ranges for the materials for which measurement arrangement 100 is designed to work.

For the type of embodiment in which resonator 114 has a free end, its resonant characteristics are relatively simple, being modeled as a simple harmonic oscillator for out-of-plane (i.e., flexural) motion. Advantageously, for this type of embodiment, the geometry and shape of only the resonator affects the resonant characteristics. Thus, for various applications, the resonance frequency can be designed by selecting only the geometry corresponding to the desired resonant frequency, while keeping the overall shape the same.

A second mode of oscillation, torsional oscillation, is also available for resonator 114. This mode of oscillation is useful for detecting in-plane motion for piezoelectric domains polarized parallel to the surface of sample 102. Thus, measurement arrangement 100, in some embodiments, includes signal generator 106 that produces a first frequency component intended to drive resonator 114 flexurally, and a second frequency component that is intended to drive resonator 114 torsionally. The resonant characteristics of resonator 114 can therefore include each fundamental resonant frequency for flexural and torsional motion, as well as their respective overtones. Since supporting cantilever 108 also has a torsional resonance, the design of resonator 114 according to one embodiment avoids the range of frequencies corresponding to torsional resonance of supporting cantilever 108 and its overtones. In a related embodiment, multiple lock-in frequencies are utilized in lock-in amplifier 118 corresponding to the different modes of oscillation of resonator 114.

In measurement arrangement 100, according to one aspect of the invention, the frequency or frequencies at which sample 102 is actuated are selected to coincide with the fundamental resonant frequency, or frequencies, of resonator 114. Accordingly, resonator 114 responds to actuation of sample 102 at the contact point with its own motion of a greater displacement than the displacement of the actuated motion of sample 102. Additionally, the motion of resonator 114 is proportional to the actuated motion of sample 102 at that frequency or frequencies. In this way, resonator 114 provides a form of mechanical preamplification of the piezoresponse of sample 102. In embodiments where both, in-plane, and out-of-plane motion of sample 102 are analyzed, the flexural and torsional motions of resonator 114 each provide mechanical amplification.

Motion of resonator 114 is detected by detection system 116. Detection system 116, can be embodied by any suitable arrangement. Examples of conventional technologies that form the state of the art and that could be utilized include, without limitation, inferometry, scanning tunneling microscopy (STM) techniques, piezoelectric sensors on the resonator, and optical beam techniques, such as the technique diagrammed in FIG. 1. For instance, in an example of the latter technique, a laser is aimed at the end of resonator 114, which in a corresponding embodiment, has a reflective target for the laser formed at its end opposite contact point 105. The laser reflects from resonator 114 onto a photodetector array, the output of which is processed using lock-in amplifier 118 to produce a measurement corresponding to the piezoresponse corresponding to contact point 105 of sample 102.

Piezoresponse amplitude data, as well as phase data (indicating the relative orientation of the piezoelectric domain of contact point 105), is obtained. As sample 102 is scanned from one contact point 105 to another, piezoresponse amplitude and phase images of its surface can be constructed of the scanned area of sample 102. The output of detection system 116 is also fed to positioning controller 112 via low pass filtering 120. Hence, the motion of resonator 114 is also used in the control loop for adjusting the relative positioning of probe 104 and sample 102. The output of positioning controller 112 comprises driving signals for either actuator 110a or 110b, or for both. Additionally, the output of low pass filtering 120 can form an image of the topography of the scanned area of sample 102.

Measurement arrangement 100, in one type of application, is part of a SPM system such as an atomic force microscope, in which sample 102 is subject to study. In another application, measurement arrangement 100 is implemented as part of a data storage system, in which sample 102 is the medium on which data is stored. In a related application, measurement arrangement 100 constitutes a part of an array of PFM probes, with each probe having a probe 104, an associated resonator 114, detection system 116, etc.

Figure 2:
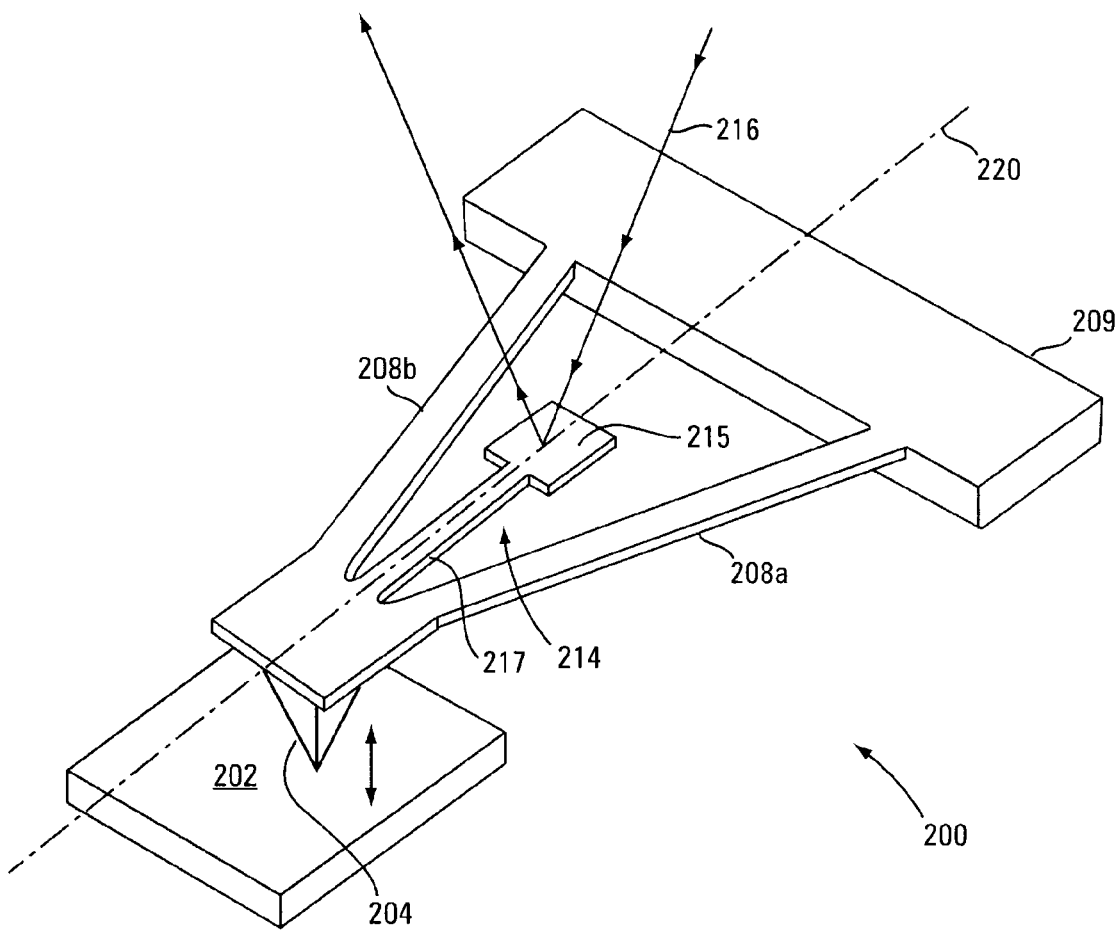
FIG. 2 is a perspective view diagram illustrating a preamplifying cantilever (PAC) according to one embodiment of the invention.

FIG. 2 is a perspective view diagram illustrating a preamplifying cantilever (PAC) 200 according to one embodiment of the invention. PAC 200 can be used with a measurement arrangement for conducting PFM of sample 202 as shown, or for conducting other SPM techniques that would benefit from the mechanical preamplification and other characteristics offered by PAC 200. PAC 200 is a compound cantilever situated along operational axis 220. At one end of PAC 200, probe tip 204 protrudes downward, as illustrated. At the other end of PAC 220 is formed a base 209 used for handling PAC 200 and for affixing PAC 200 to a measurement arrangement (such as to an actuator or to a point of fixation, neither of which is shown in FIG. 2). Resonator 214 is rigidly connected to probe tip 204 at one end of resonator beam 217, and has a target 215 at the other end of beam 217 facilitating optical beam detection methods for detecting motion of resonator 214. In the embodiment shown, target 215 has a surface that reflects a major portion of laser 216 utilized in an optical beam motion detector. Together, beam 217 and target 215 of resonator 214 have a general paddle-like shape. It should be understood, however, that the shape and geometry of resonator 214 can take any suitable form within the spirit of the invention, including shapes that do not utilize a target for optical beam motion detection.

Figure 3:
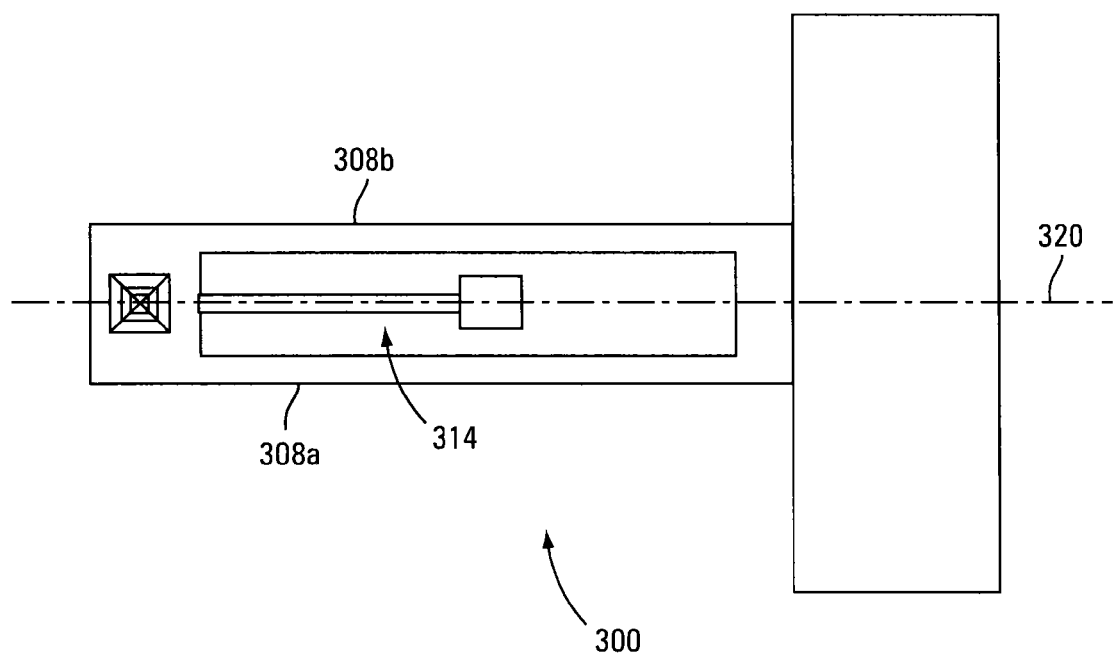
FIG. 3 is a plan view diagram illustrating a different design of a PAC according to another embodiment.

The main cantilever portion of PAC 220 includes beams 208a and 208b arranged in a generally triangular fashion with probe tip 204 being at the triangle's apex. Beams 208a and 208b are situated symmetrically about operational axis 220 in the embodiment shown. Principles of the invention could be used with other suitable arrangements of the main cantilever portion. For example, FIG. 3 is a plan view diagram illustrating PAC 300 according to another embodiment, in which the main cantilever portion consists of a pair of beams, 308a and 308b, both of which run parallel to operational axis 320. Resonator 314 is situated such that it can oscillate perpendicular to the place defined by beams 308a and 308b. Other alternative arrangements will be described below, but it is to be understood that those examples are not an exhaustive presentation of the possible configurations for a PAC according to embodiments of the invention.

Turning back to FIG. 2, in PAC 200, resonator 214 is integrally formed with the rest of the cantilever, including main cantilever beams 218a and 208b, probe tip 204, and base 209. The fabrication techniques for constructing PAC 200 are generally known. PAC 200 can be fabricated using conventional processing steps used for constructing existing SPM cantilevers. For example, the fabrication techniques described in Turner et al., WIPO Publication No. WO 2007/095360, the contents of which are incorporated herein by reference, can be used.

Figure 4:
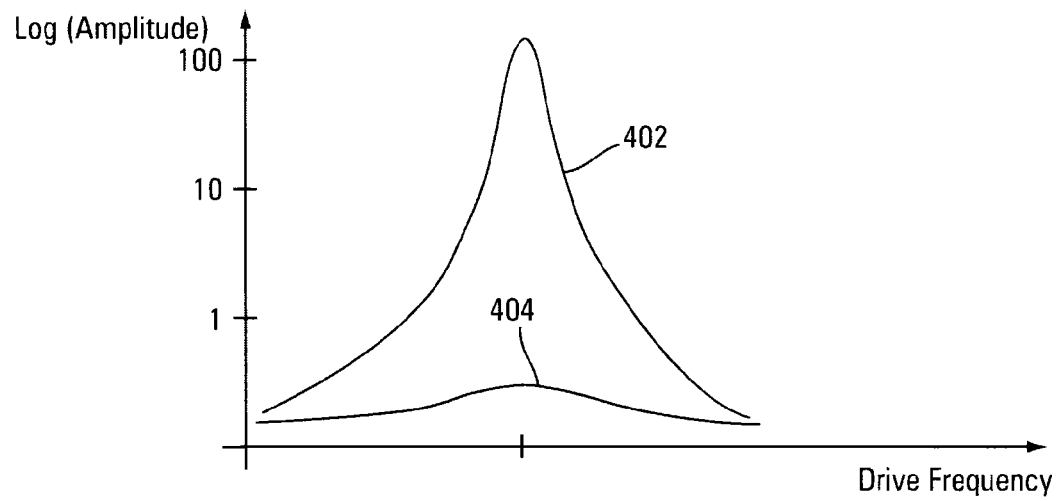
FIG. 4 is a graph illustrating the resonant enhancement of the output amplitude of a resonator according to an embodiment of the invention.

FIG. 4 is a graph illustrating the resonant enhancement of the output amplitude of resonator 214. The ordinate of the graph is the logarithmic amplitude signal measured at resonator 214, and the abscissa of the graph is the drive frequency of the input signal at probe tip 204. Curve 402 represents two orders of magnitude or more improvement measured at resonator 214 when the resonator is in resonance. In contrast, curve 404 represents the signal measured at the tip end of cantilever 200 (on the top surface-opposite the tip) instead of at resonator 214.

Figure 5:
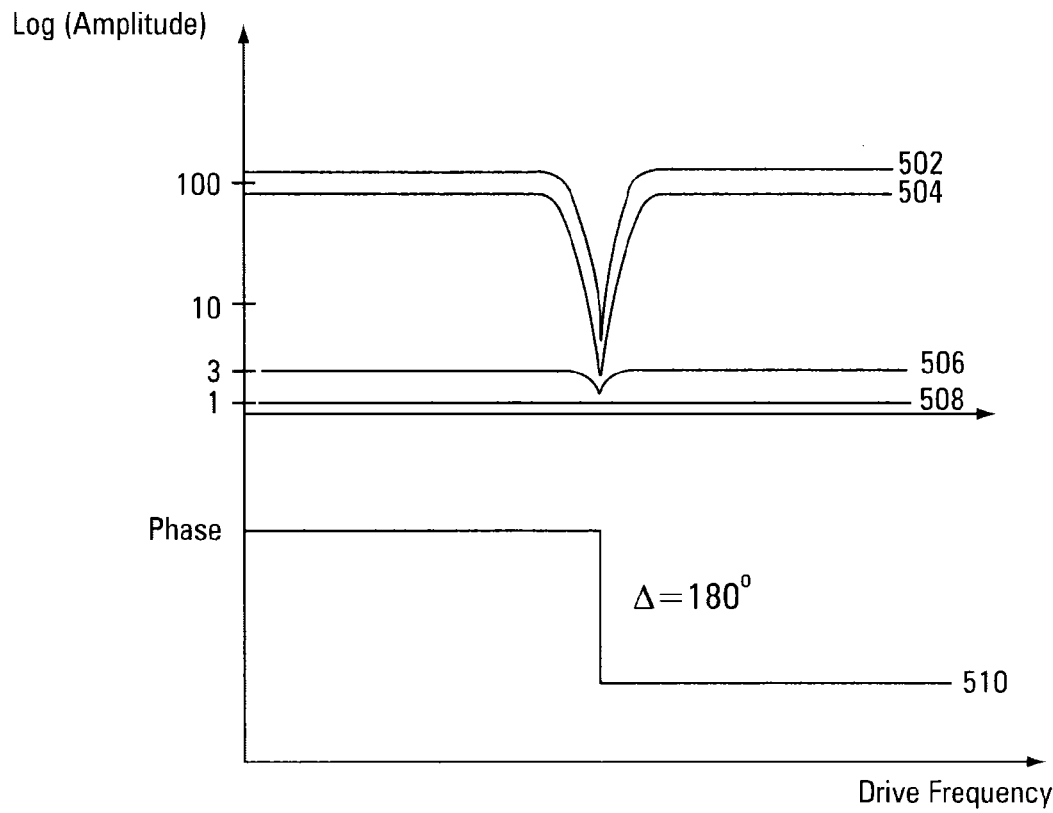
FIG. 5 represents a specific application of the PAC of FIG. 2 for piezoresponse force microscopy (PFM).

FIG. 5 represents a specific application of the PAC 200 for piezoresponse force microscopy (PFM). Curve 502 shows the amplitude of the signal measured on two oppositely polarized domains. Curve 504 represents the amplitude of the signal measured on the same domains with contact resonance PFM. As described above, inherent challenges with contact resonance PFM include coupling of the mechanical properties of both the sample and the probe into the PFM measurements. Curve 506 represents the amplitude of the signal measured with regular PFM. Curve 508 represents the background signal measured for purposes of correcting out the floor noise.

The method of operation of PAC 200 for the characterization of its amplification, and comparisons to contact resonance-PFM were developed using samples of periodically poled lithium niobate (PPLN). The choice of this material was based on its two characteristics, viz., smooth surface (roughness of <1 nm) and well distinguished ferroelectric domains with vertically up and downward oriented PR vectors of equal amplitude. Thus, one PPLN domain oscillates in phase with the electric field, the other out of phase with it. To make the comparison with contact resonance PFM operation, commercially available cantilevers, of a type known as metal coated etched silicon probe (MESP) (marketed under the trade name Veeco Probes), having nominal length of 225 um, and a spring constant of 2-5 N/m, were chosen because of their accepted general use for PFM studies. The PR vector amplitudes were compared when the applied ac bias frequency was equal to the paddle resonance frequency for PAC 200 with contact resonance PFM operation of a MESP cantilever, providing a one-to-one comparison. The PR vector amplitudes can be expressed in picometer per volt of applied ac bias by converting the measured signal in mV to picometer using the static displacement sensitivity, also known as the inverse optical lever sensitivity.

For comparison, the method of operation for PAC 200 was developed analogous to contact resonance-PFM of a MESP. The laser was aligned on target 215 of PAC 200 and positioned on the center of a four-quadrant photodiode detector. The probe was then approached to the PPLN sample, and the surface was scanned by maintaining tip-sample force enough to track the surface. An AC bias of 1 V amplitude (2 V peak-to-peak) was applied to the sample. A frequency sweep of the ac bias was performed to measure the first resonance of resonator 214. Similarly, for the MESP probe, the laser was aligned at the apex of the cantilever and, once on the PPLN sample, the contact resonance frequency was determined by sweeping the AC bias frequency. The static displacement sensitivities were then determined for both a PAC and a MESP cantilever to convert the response in mV to picometer. Finally, in order to normalize the data the PR vector was converted into picometer (or nanometer) per volt of applied ac bias.

Figure 6:
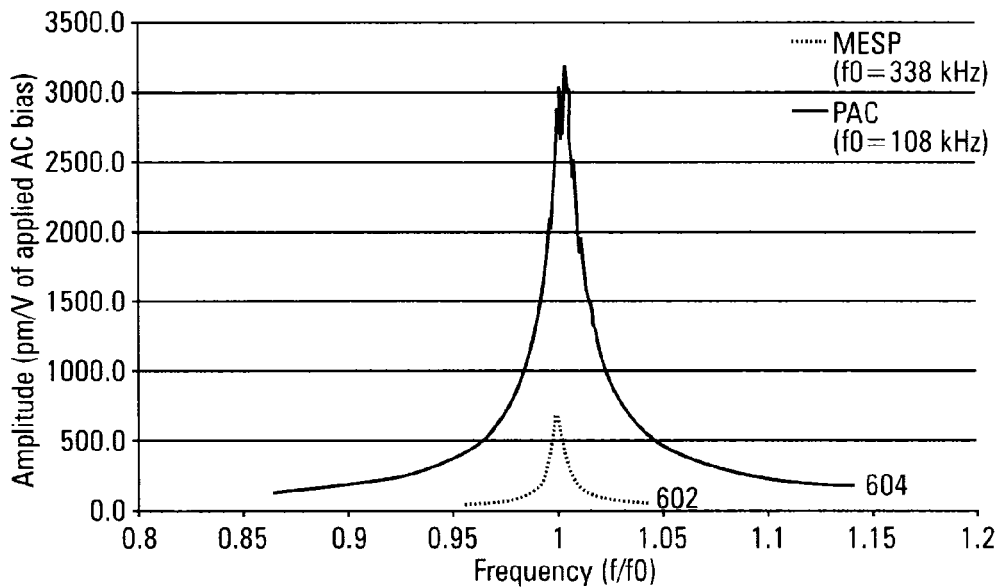
FIGS. 6 and 7 are graphs comparing performance of a conventional MESP cantilever operating at its contact resonance, with the PAC of FIG. 2 operated according to embodiments of the invention.

FIG. 6 shows the measured PR vector amplitude as a function of frequency for a MESP cantilever operating at its contact resonance (curve 602), along with the PR vector amplitude with the laser aligned on target 215 for PAC 200 (curve 604). The maximum response of MESP cantilever operating in contact resonance-PFM was measured to be about 700 pm/V, whereas the maximum response of PAC 200 at resonance was measured to be 3000 pm/V. The maximum amplitude reached will depend on the time for which the oscillator was allowed to "ring up." In order to ensure an equivalent comparison, both MESP and PAC cantilevers were allowed to ring up for the same amount of time. As can be inferred from the measured PR vector amplitudes, the amplitude response of PAC 200 at resonance is as good as or better than the MESP cantilevers in contact resonance PFM. When comparing amplitudes away from resonance, versus at resonance, at least an order of magnitude improvement (~3000 pm compared to ~100 pm) in the signal was measured.

Next, the PR imaging performance of PAC 200 was evaluated in comparison with that of MESP cantilevers in contact resonance PFM. Data representing the height, PR amplitude, and PR phase scans of the PPLN surface obtained with a MESP cantilever operating at its contact resonance at 338.1 kHz when 1 V amplitude AC bias was applied to the sample, was obtained. Additionally, data representing height, PR amplitude, and PR phase scans were obtained with PAC 200 operating at a resonator 214 resonance of 104.5 kHz for the same applied sample bias. The scan velocity was maintained at 70 um/s and the static displacement sensitivity for both MESP as well as PAC was about 78 nm/V. Analysis of the surface scan with the laser aligned on the paddle clearly demonstrated that good topographical imaging is possible using PAC 200. Because PAC 200 is designed such that the frequency of the topographical features is to be much smaller than the paddle resonance of 104 kHz, the height signal had a unity gain for the dc deflection signal with the laser aligned on the paddle.

Figure 7:
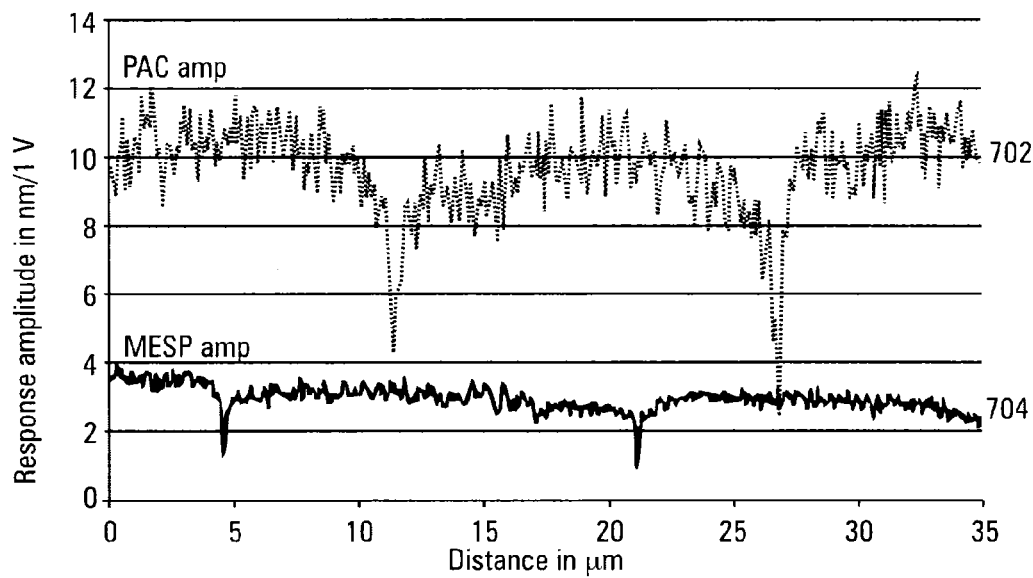

The domains on the PPLN surface were also clearly distinguishable in the PR amplitude data. A phase difference of 180° was measured between adjacent oppositely polarized ferroelectric domains. In order to compare the response amplitudes and to understand the SNR during scanning, section the analysis as shown in FIG. 7 was performed. Curve 702 denotes the PR amplitude of PAC 200, whereas curve 704 denotes the MESP's PR amplitude. PAC 200 shows at least three times as much signal as the MESP cantilever, validating the frequency response data from FIG. 6. Thus the out-of-plane PR vector was completely measured and quantified using PAC 200 with signals at least as good as, and generally superior to, commonly used MESP cantilevers in contact resonance mode.

Figure 8:
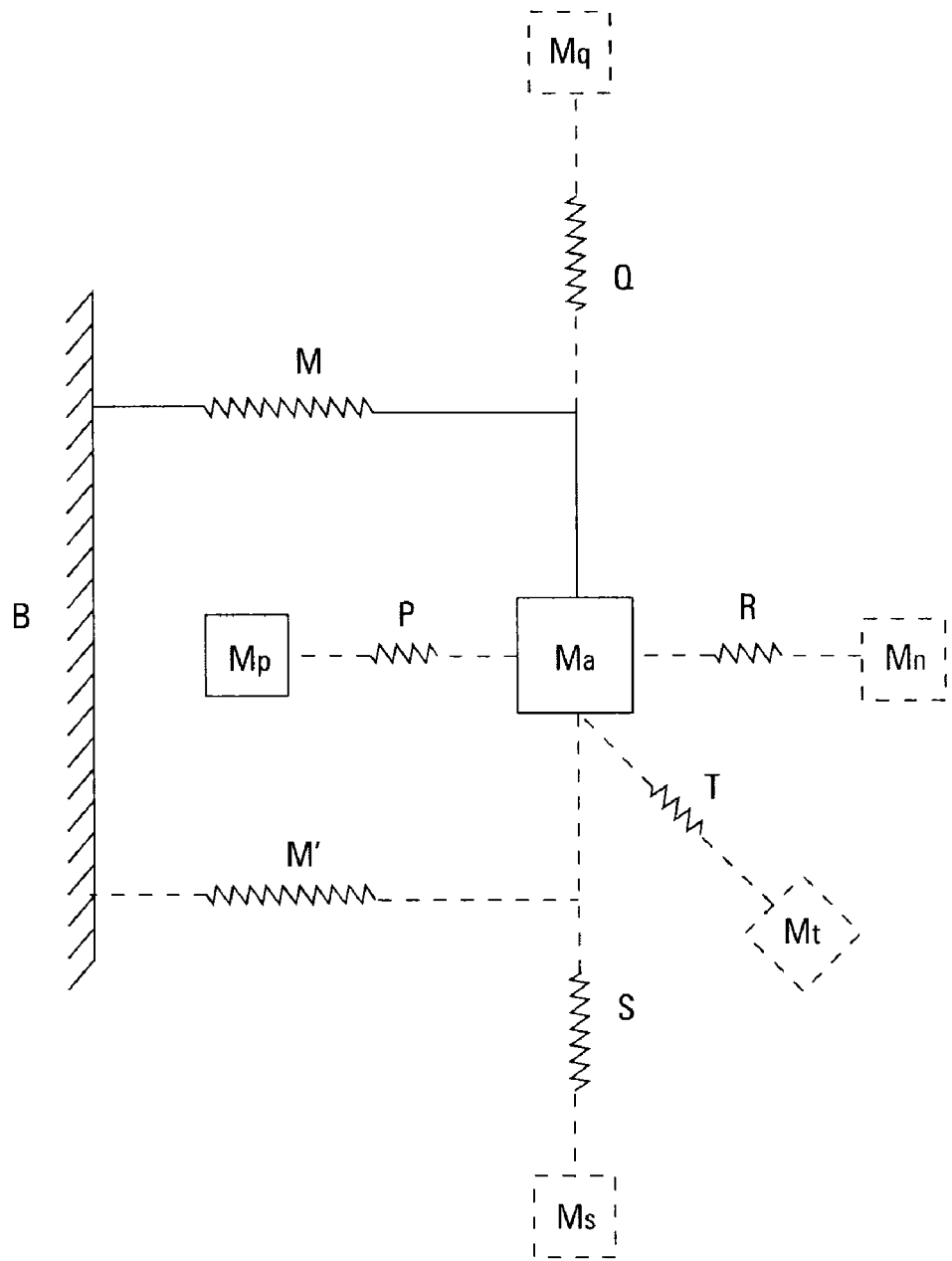
FIG. 8 is a spring mass diagram illustrating various alternative configurations of PACs according to other embodiments of the invention.

In other embodiments of PACs according to aspects of the invention, the arrangement of the resonator relative to other parts of the PAC can vary substantially. FIG. 8 is a spring mass diagram illustrating various alternative configurations according to other embodiments. The main spring M and/or M' is attached to the base B on one end and to a mass $M_a$ on the other end. The input signal is measured locally at mass $M_a$. The resonator spring-mass combinations could be in multiple positions denoted by P, Q, R, S and T, respectively, attached to masses $M_p$, $M_q$, $M_r$, $M_s$, and $M_t$, respectively. In one type of embodiment, that the main spring-mass and resonator spring-mass systems are not perpendicular to each other, as illustrated by position T.

Figure 9:
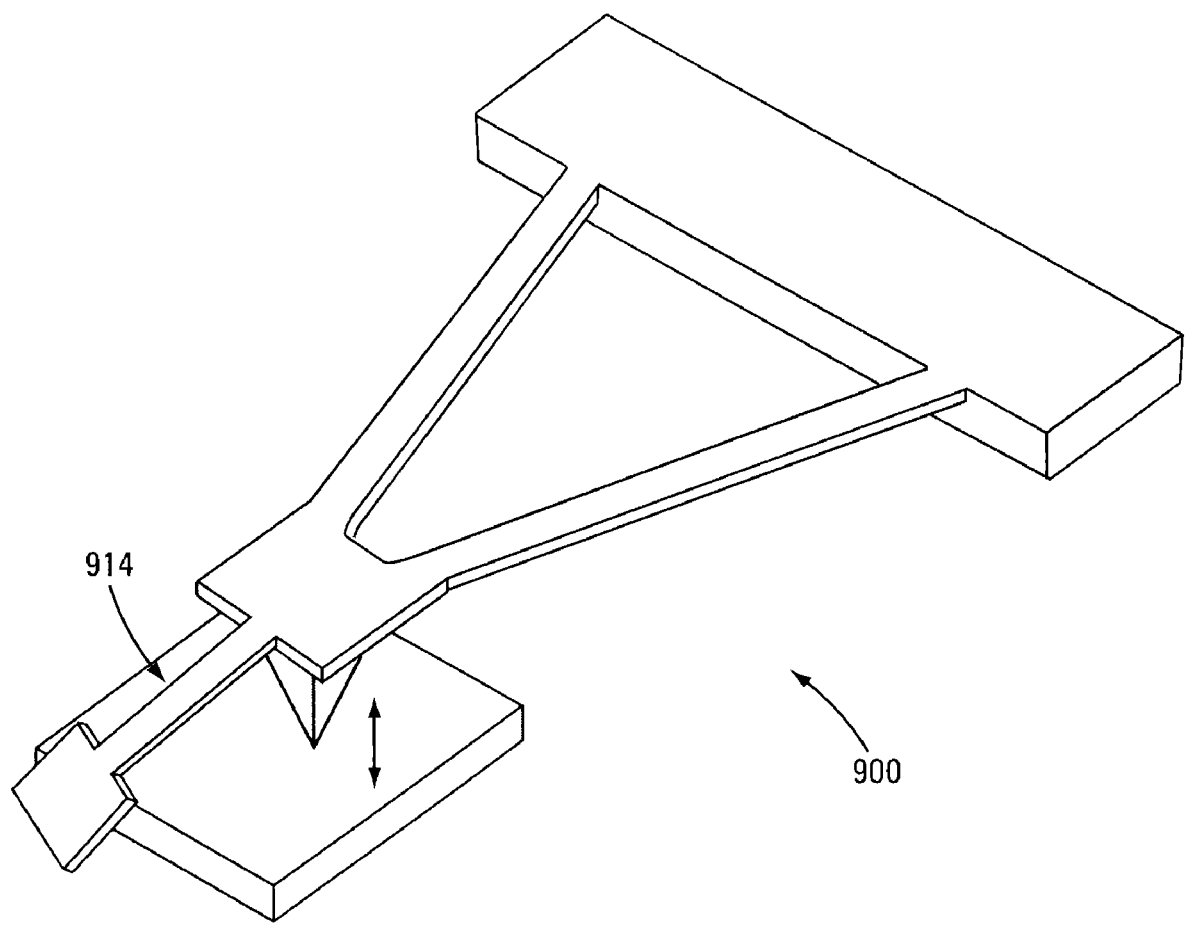
FIG. 9 illustrates another embodiment, in which a resonator of a PAC is situated on the opposite side of the probe tip compared to the configuration of FIG. 2.

Thus, referring briefly to FIG. 2, the resonator can be along the operational axis of the PAC. FIG. 9 illustrates another embodiment, in which resonator 914 of PAC 900 is situated on the opposite side of the probe tip compared to the configuration of PAC 200. If the resonator is mounted parallel to the main cantilever (as R and P in FIG. 8) the flexural resonance of the resonator will be driven by the out-of-plane motion of the sample, and the torsional resonance of the resonator will be driven by the in-plane motion of the sample.

Figure 10:
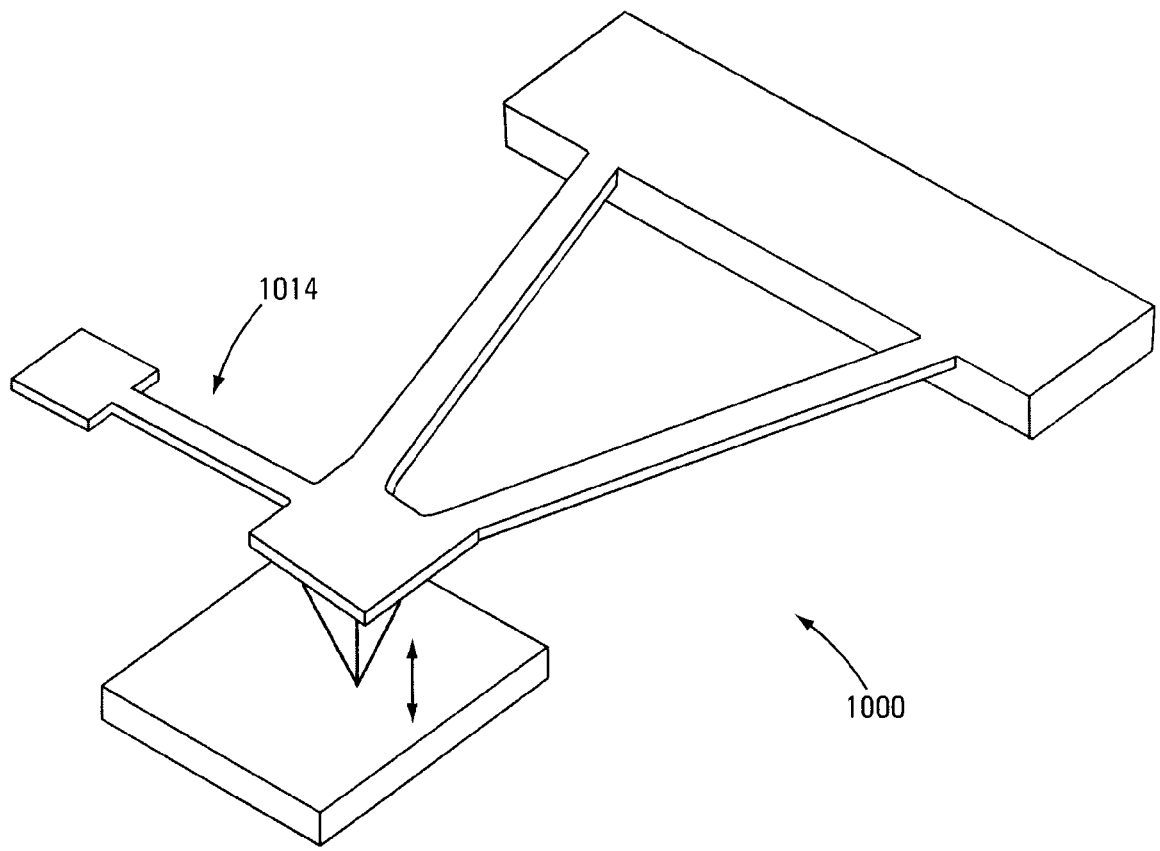
FIG. 10 illustrates another variation of a PAC according to one embodiment, in which the resonator is situated 90 degrees off-axis.
Figure 11:
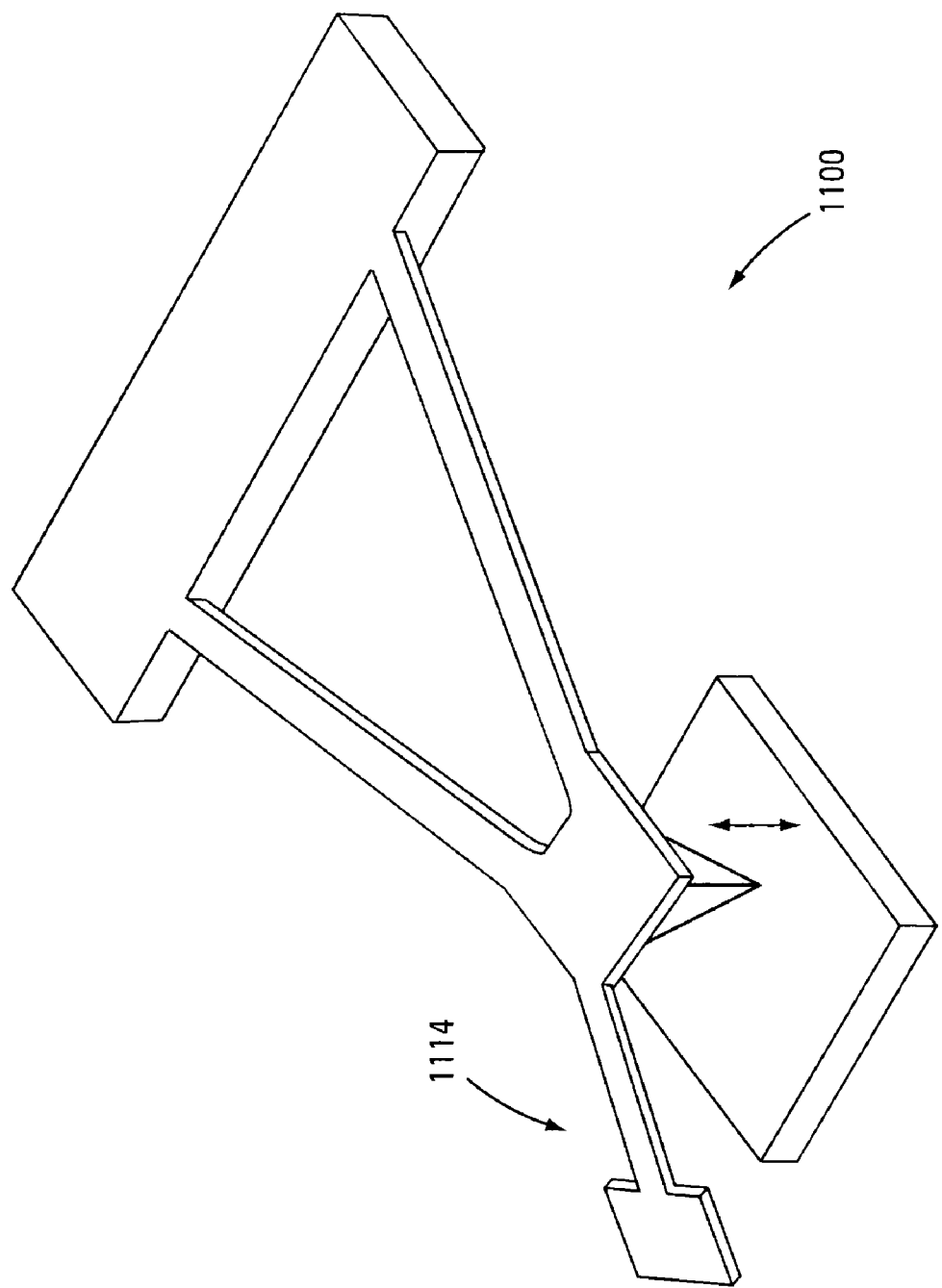
FIG. 11 illustrates yet another variation according to an embodiment, in which the PAC resonator is situated at an angle to the operational axis of the cantilever.

In other embodiments, such as positions Q, S, and T of FIG. 8, the resonator can be situated off-axis. In the embodiment illustrated in FIG. 10, resonator 1014 of PAC 1000 is situated 90 degrees off-axis, as in positions Q and S of FIG. 8. In this type of perpendicular arrangement, the torsional resonance of resonator is driven by the out-of-plane motion of the sample, and the flexural resonance of the resonator will be driven by the in-plane motion of the sample. In the embodiment of FIG. 11, corresponding to position T of FIG. 8, resonator 1114 of PAC 1100 is situated at an angle to the operational axis of the cantilever. In this type of arrangement, either flexural or torsional resonances can be excited by in-plane or out-of-plane sample motion depending on the frequency of the sample motion.

Figure 12:
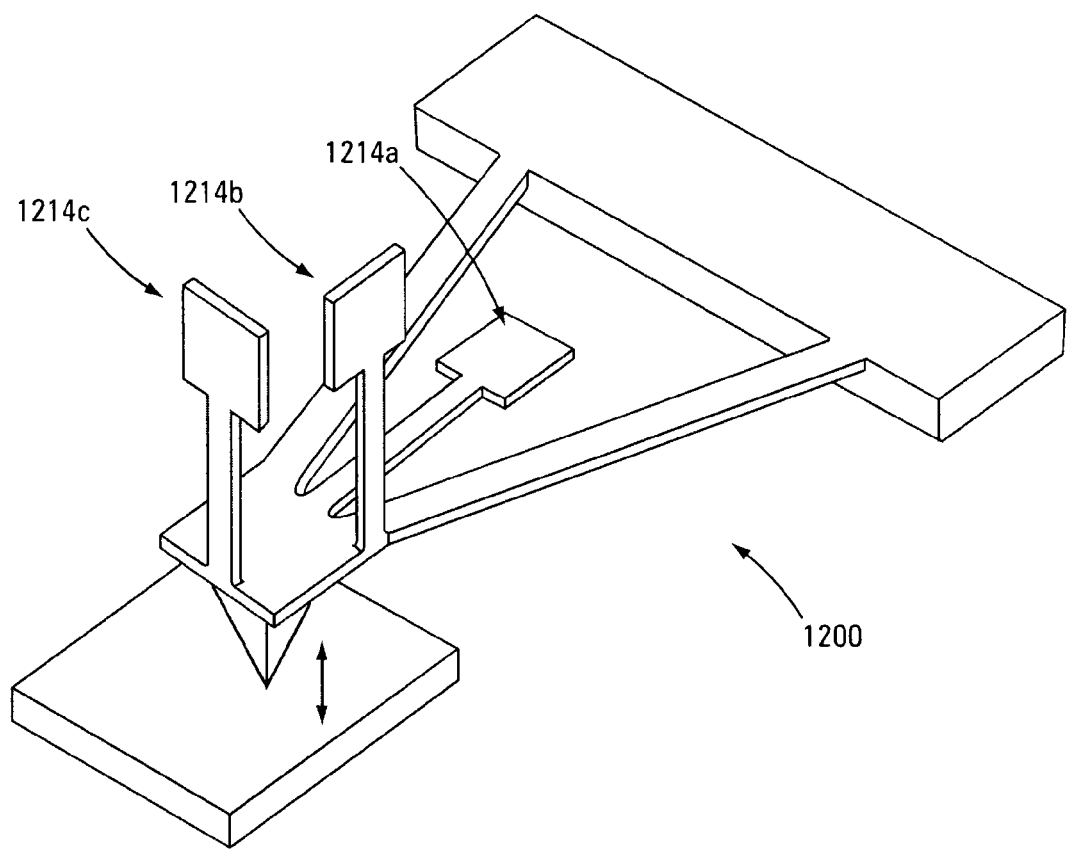
FIG. 12 illustrates other types of embodiments in which the resonator can be out of the plane of the main cantilever, and in which there can be multiple resonators on a single PAC.

In other types of embodiment, as illustrated in combined form in FIG. 12, the resonator can be out of the plane of the main cantilever. For instance, resonators 1214*b* and 1214*c* are each situated in a plane that is distinct from the plane in which resonator 1214*a* is situated. Accordingly, the flexural motions of each of the cantilevers will respond to correspondingly different vectors of motion of the probe tip due to movement of the sample's surface. The different planes can be orthogonal, as illustrated for PAC 1200, or non-orthogonal.

Another type of embodiment shown in FIG. 12 is one where more than one resonator is present on a PAC. The multiple resonators can be situated in the same plane, or in different planes, as illustrated for PAC 1200. The corresponding measurement arrangement has a separate motion detection system for each resonator. In one embodiment, different types of motion detection systems are used for different resonators. In various embodiments having multiple resonators, the different resonators have the same resonant frequency or, alternatively, different resonant frequencies, depending on the desired application.

Figure 13A:
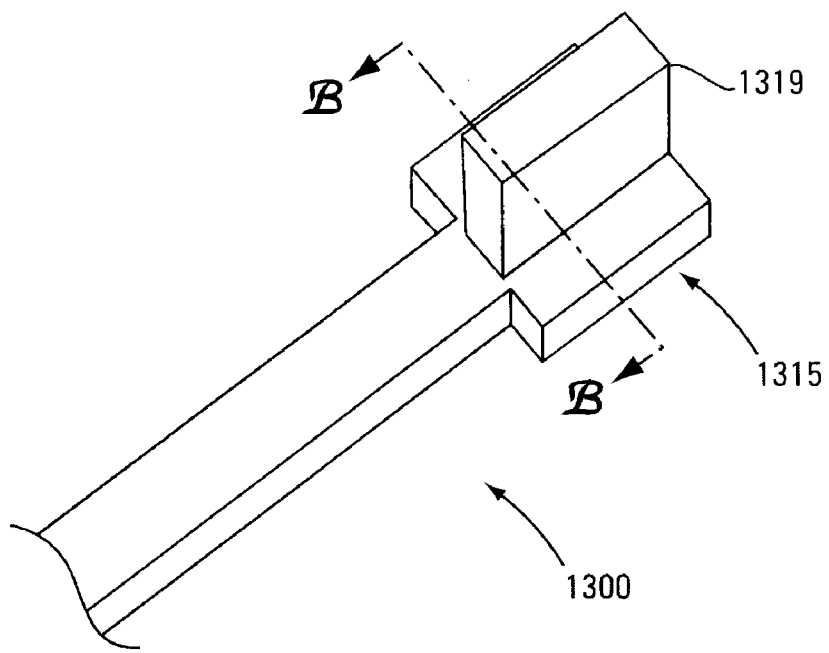
FIGS. 13A and 13B illustrate an example embodiment of a resonator that is designed for increased sensitivity to torsional motion.
Figure 13B:
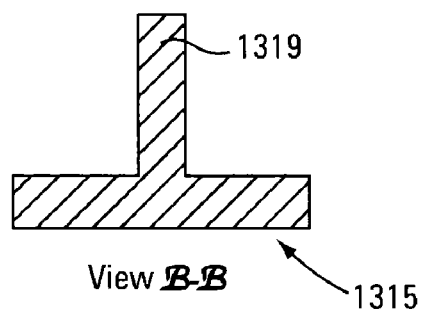

FIGS. 13A and 13B illustrate an example embodiment of resonator 1300 that is designed for increased sensitivity to torsional motion. Resonator 1300 includes a protruding feature 1319 that is asymmetrical about a reference plane in which the surface of target 1315 is defined. In the embodiment depicted in FIGS. 13A and 13B, protruding feature 1319 is in the form of a tail that projects from the bottom side of the resonator (opposite the surface of target 1315). As shown in FIG. 13B, the resulting cross-section is T-shaped. When subjected to forces caused by in-plane motion of the sample during PFM measurement, protruding feature 1319 enhances the tendency of resonator 1300 to move torsionally.

Another aspect of the invention is directed to further improving the performance of PFM and other SPM techniques incorporating a dedicated resonator. Embodiments according to this aspect of the invention arise from the challenge presented by electrostatic effects experienced when analyzing or measuring certain types of materials. When scanning a material during PFM, there can be a non-uniform charge distribution of the surface being scanned. This condition is present in periodically poled lithium niobate (PPLN) domains, for example. In cases where the resonator has an intrinsic charge, there can be different DC electric potentials between the resonator and the sample as the resonator passes over different PPLN domains. Since these conditions result in additional forces acting on the resonator, the resonator's resonant frequency can vary during the scan.

Figure 14:
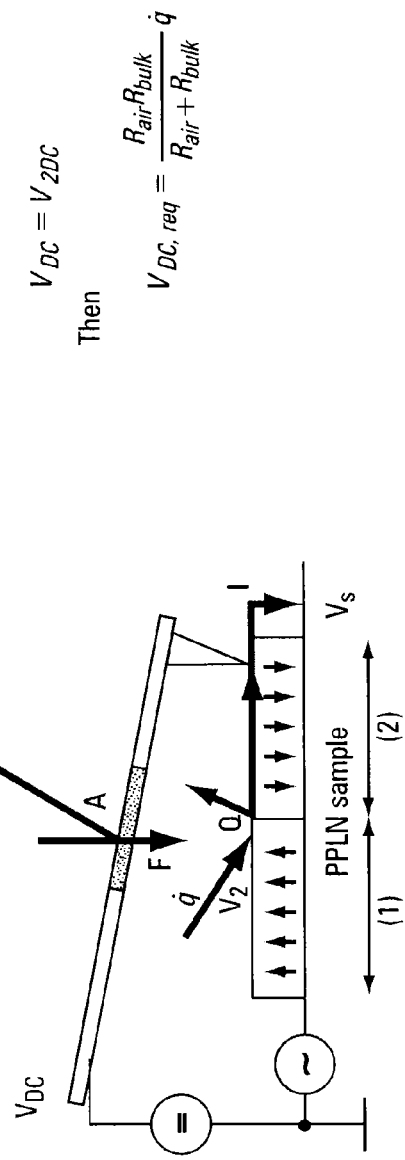
FIG. 14 diagrammatically illustrates a technique for applying DC bias to compensate for the electrostatic effects according to one embodiment of the invention.
Figure 14:
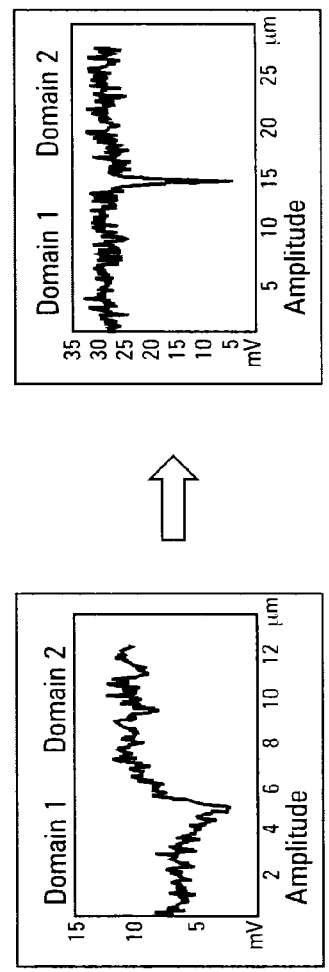

Accordingly, in one type of embodiment, the measurement arrangement (such as measurement arrangement 100 of FIG. 1) includes an electrostatic charge correction arrangement. In one embodiment of this type, the electrostatic correction arrangement includes a DC bias signal such as DC component 106' (FIG. 1). FIG. 14 diagrammatically illustrates a technique for applying DC bias to compensate for the electrostatic effects according to one embodiment.

Other embodiments of an electric charge corrections include preventing static electric fields between the sample and the resonator. In one such embodiment, the air between the resonator and the sample is ionized. Any suitable techniques may be used for ionizing the air, such as using an alpha radiation source. Similarly, in another embodiment, the measuring arrangement provides a polar fluid between the resonator and the sample. In both of these approaches, the static electric field is dissipated through the conductive medium surrounding the resonator and sample. In another embodiment, the electrostatic correction arrangement includes a shielding arrangement positioned between the sample and the resonator. In another embodiment, the measurement arrangement is constructed such that spacing between the resonator and the surface of the sample is so large that the electrostatic effects are marginalized. In a further embodiment, provisions are made to reduce surface charging of the resonator, such as, for example, turning off the laser when the motion of the resonator is not being measured. In yet another embodiment, the sample is coated to reduce its resistance. According to a further embodiment, a resonator that is entirely or substantially non-conductive is utilized.

The embodiments above are intended to be illustrative and not limiting. Additional embodiments are within the claims. In addition, although aspects of the present invention have been described with reference to particular embodiments, those skilled in the art will recognize that changes can be made in form and detail without departing from the spirit and scope of the invention, as defined by the claims.

Persons of ordinary skill in the relevant arts will recognize that the invention may comprise fewer features than illustrated in any individual embodiment described above. The embodiments described herein are not meant to be an exhaustive presentation of the ways in which the various features of the invention may be combined. Accordingly, the embodiments are not mutually exclusive combinations of features; rather, the invention may comprise a combination of different individual features selected from different individual embodiments, as understood by persons of ordinary skill in the art.

Any incorporation by reference of documents above is limited such that no subject matter is incorporated that is contrary to the explicit disclosure herein. Any incorporation by reference of documents above is further limited such that no claims included in the documents are incorporated by reference herein. Any incorporation by reference of documents above is yet further limited such that any definitions provided in the documents are not incorporated by reference herein unless expressly included herein.

For purposes of interpreting the claims for the present invention, it is expressly intended that the provisions of Section 112, sixth paragraph of 35 U.S.C. are not to be invoked unless the specific terms "means for" or "step for" are recited in a claim.

What is claimed is:

1. A preamplifying cantilever arrangement for use with a scanning probe microscope (SPM), comprising:
    a main cantilever portion having a first operational length defined by a first end and a second end,
        wherein the first end is formed such that, when operably mounted in a SPM, the main cantilever portion is supported by the first end, and
        wherein the second end has a protruding tip adapted to contact a surface of an actuable material; and
    a resonator cantilever portion having a second operational length defined by a third end and a fourth end, the third end being connected to the main cantilever portion;
    wherein the main cantilever portion is formed such that, when the preamplifying cantilever is used in a measurement arrangement in which the protruding tip is in contact with a surface of the actuable material, the main cantilever portion exhibits a first set of resonance characteristics that include a first set of fundamental frequencies and corresponding overtones; and
    wherein the resonator cantilever portion is formed such that it has a second set of resonance characteristics including a second set of fundamental frequencies and corresponding overtones, the second set of resonance characteristics being substantially distinct from any frequency of the first set of fundamental frequencies and at least a substantial portion of the overtones corresponding to the first set of fundamental frequencies, such that resonant motion of the resonator cantilever is substantially un-coupled from any resonant motion of the main cantilever portion when the preamplifying cantilever is used in the measuring arrangement.

2. The preamplifying cantilever arrangement of claim 1, wherein the cantilever arrangement is formed such that oscillatory motion of the resonator cantilever portion is uncoupled from the main cantilever portion.

3. The preamplifying cantilever arrangement of claim 1, wherein the first set of fundamental frequencies and their overtones include:

a range of fundamental frequencies corresponding to resonance of flexural motion of the main cantilever portion, and their overtones; and a range of fundamental frequencies corresponding to resonance of torsional motion of the main cantilever portion, and their overtones.

4. The preamplifying cantilever arrangement of claim 1, wherein the second set of fundamental frequencies and their overtones include:

a fundamental frequency corresponding to resonance of flexural motion of the resonator cantilever portion, and its overtones; and a fundamental frequency corresponding to resonance of torsional motion of the main cantilever portion, and its overtones.

5. The preamplifying cantilever arrangement of claim 1, wherein the third end of the resonator cantilever portion is connected to the main cantilever portion at or near the second end.

6. The preamplifying cantilever arrangement of claim 1, wherein the main cantilever portion includes an electrically conductive path between the first end and the tip situated at the second end.

7. The preamplifying cantilever arrangement of claim 1, wherein the fourth end is a free end of the resonator cantilever portion.

8. The preamplifying cantilever arrangement of claim 1, wherein the main cantilever portion is constructed to be mechanically coupled to a positioning actuator of the SPM.

9. The preamplifying cantilever arrangement of claim 1, wherein the main cantilever portion and the resonator cantilever portion are integrally formed.

10. The preamplifying cantilever arrangement of claim 1, wherein the resonator cantilever portion comprises a first resonator structure and a second resonator structure having a different configuration than the first resonator structure.

11. A measurement arrangement for analysis of a surface motion of a material resulting from actuation of the material, the arrangement comprising:

a signal generator constructed to generate a stimulus signal having at least an alternating current component at a first frequency, the stimulus signal being adapted to actuate a portion of the surface of the material during measurement to create an actuated motion;

a probe having a tip contacting the surface of the material at a contact point, wherein the contacting of the probe and the surface of the material is achieved via a controlled probe-sample interaction;

a resonant cantilever having a fixed end and a free end, the fixed end being fixed to the contact point during measurement via a mechanical coupling having a sufficient rigidity such that substantially all of the actuated motion of the material is transmitted to the resonant cantilever; and a detection system configured to detect motion of the resonant cantilever during measurement.

12. The measurement arrangement of claim 11, wherein the actuated motion is based on a transduction effect selected from the group consisting of: a piezoelectric effect, a thermomechanical effect, an electromechanical effect, a magnetic effect, an electrorestrictive effect, or any combination thereof.

13. The measurement arrangement of claim 11, wherein the material is a material having piezoelectric properties, and wherein the tip is electrically coupled to the signal generator to facilitate transmission of the stimulus signal between the signal generator and the contact point during measurement.

14. The measurement arrangement of claim 11, wherein the motion of the resonant cantilever is a resonant motion that is proportional to the actuated motion of the surface of the material at the contact point, and is generally unaffected by mechanical properties or topography of the surface of the material.

15. The measurement arrangement of claim 11, wherein the resonant cantilever has a resonant frequency that generally coincides with the first frequency.

16. The measurement arrangement of claim 11, wherein the stimulus signal includes an alternating current component at a second frequency, and wherein the resonant cantilever has a flexural resonant frequency that generally coincides with the first frequency, and a torsional resonant frequency that generally coincides with the second frequency; and wherein the detection system is adapted to detect flexural and torsional motion of the resonant cantilever.

17. The measurement arrangement of claim 11, further comprising a second cantilever having a first end and a second end; wherein the probe is situated at the first end of the second cantilever; and wherein the second end is held stationary during measurement.

18. The measurement arrangement of claim 17, wherein the resonant cantilever and the second cantilever are integrally formed such that they collectively define a compound cantilever, wherein the compound cantilever comprises the rigid mechanical coupling between the fixed end of the resonant cantilever and the contact point on the surface of the material.

19. The measurement arrangement of claim 17, wherein the second cantilever and the probe are integrally formed.

20. The measurement arrangement of claim 11, wherein the detection system comprises an optical detection system.

21. The measurement arrangement of claim 11, further comprising an electrostatic charge correction arrangement adapted to compensate for any presence of electric potential between the surface of the material and the resonant cantilever.

22. The measurement arrangement of claim 21, wherein the electrostatic charge correction arrangement comprises at least one arrangement selected from the group consisting of: a DC bias signal applied to at least one of the surface of the material and the resonant cantilever, an air ionization system adapted to dissipate the electrostatic charge, a polar fluid situated at least between the resonant cantilever and the surface of the material; a shielding arrangement between the resonant cantilever and the surface of the material; a spacing arrangement that establishes an increased separation between the resonant cantilever and the surface of the material, or any combination thereof.

23. The measurement arrangement of claim 11, wherein at least a majority of the resonant cantilever is non-conductive.

24. The measurement arrangement of claim 11, wherein the measurement arrangement is a part of a scanning probe microscope (SPM) system, wherein during measurement the material is a sample being analyzed.

25. The measurement arrangement of claim 11, wherein the measurement arrangement is a part of a data storage system, wherein during measurement the material is a data storage medium.

26. The measurement arrangement of claim 11, further comprising:

at least one additional probe having a tip contacting the surface of the material at at least one corresponding additional contact point; and at least one additional resonant cantilever, each of which corresponds to each of the at least one additional probe, wherein each of the at least one additional resonant cantilever has a fixed end and a free end, the stationary end being coupled to the corresponding contact point during measurement via a corresponding rigid mechanical coupling.

27. A system for measuring a surface configuration of a material, the system comprising:
 a signal generator constructed to generate a stimulus signal having at least an alternating current component at a first frequency, the stimulus signal being adapted to actuate a portion of the surface of the material;
 a probe tip adapted to contact the surface of the material at a positionable contact point established by a relative positioning of the probe tip and the material, wherein the contact is defined based on a constant interaction force between the probe tip and the surface of the material;
 a positioning system operably coupling the probe tip and the material, and configured to control the constant interaction force between the probe tip and the surface of the material, and to adjust the relative positioning of the probe tip and the material to re-position the contact point;
 a preamplifying cantilever having a supporting segment and a resonator segment;
  wherein the supporting segment is part of the positioning system and has a probe end comprising the probe tip; and
  wherein the resonator segment is a distinct segment from the supporting segment and has resonant characteristics that substantially differ from resonant characteristics of the supporting segment, wherein the resonator segment has a first end coupled to the probe tip such that substantially all motion of the probe tip is transmitted to the resonator segment; and
 a detector configured to detect motion of the resonator segment;
 wherein the system is constructed such that, in operation, the motion of the resonator segment is caused by the stimulus signal actuating the material at the contact point.

28. The system of claim 27, wherein the stimulus signal actuates the material based on a transduction effect selected from the group consisting of: a piezoelectric effect, a thermomechanical effect, an electromechanical effect, a magnetic effect, an electrorestrictive effect, or any combination thereof.

29. The system of claim 27, wherein the positioning system is configured to control the interaction force such that substantially all motion of the material being actuated by the stimulus signal is transmitted to the resonator segment.

30. The system of claim 27, wherein the probe tip is configured to be electrically coupled to the signal generator via a signal path that includes the supporting segment.

31. The system of claim 27, wherein actuation of the material at the contact point by the stimulus signal causes motion of the supporting segment, and wherein the motion of the supporting segment is non-resonant while the motion of the resonator portion is resonant.

32. The system of claim 27, wherein the system is constructed such that, in operation, the stimulus signal actuates the material at the contact point causing motion of the probe tip, and wherein the motion of the resonator segment has a greater displacement than motion of the probe tip.

33. The system of claim 27, wherein the resonator segment is distinct from the positioning system.

34. The system of claim 27, wherein the resonator segment has a first resonant frequency that matches the first frequency of the stimulus signal.

35. The system of claim 27, wherein the resonator segment has a second resonant frequency, and wherein the stimulus signal includes a second frequency that matches the second resonant frequency of the resonator segment.

36. The system of claim 27, wherein the resonator segment has a second end that is a free end.

37. The system of claim 27, wherein the resonator segment has a second end that includes a reflective target for a beam of light.

38. The system of claim 27, wherein the preamplifying cantilever is oriented along a reference axis, and wherein the resonator segment is also oriented along the reference axis.

39. The system of claim 27, wherein the preamplifying cantilever is oriented along a reference axis, and wherein the resonator segment is oriented off-axis of the reference axis.

40. The system of claim 27, wherein the preamplifying cantilever is oriented along a reference axis, and includes a second supporting segment arranged symmetrically across the reference axis from the supporting segment.

41. The system of claim 27, wherein the supporting segment includes a base end, and wherein in operation, the base end is held fixed relative to the material when the probe tip is at the contact point.

42. The system of claim 27, wherein the probe tip is constructed such that the contact point is smaller than individual piezoelectric domains of the material.

43. The system of claim 27, further comprising an electrostatic charge correction arrangement adapted to compensate for any presence of electric potential between the material and the resonator segment.

44. A method for conducting analysis of nanoscale surface motion of a surface of a material, the method comprising:
 applying a stimulus signal including a first frequency component to a contact point on the surface of the material such that the stimulus signal actuates a portion of the material to produce a motion as a result of a piezoelectric effect; and
 rigidly coupling a resonant device to the contact point such that substantially all of the actuated motion of the material is transmitted to the resonant device, and such that the resonant device experiences a resonant motion at the first frequency component in response to the motion of the material, the resonant motion having a greater displacement than a displacement of the motion of the material, and is substantially unaffected by mechanical properties of the material at the contact point; and
 detecting and processing the resonant motion of the resonant device to produce a measurement representing the piezoresponse of the material at the contact point.

* * * * *